INVENTORS
JAMES SIDLES
DONALD R. BARTLEY
BY W. A. Shira, ATTY.

United States Patent Office 3,621,808
Patented Nov. 23, 1971

3,621,808
EXCESSIVE DEFLECTION WARNING DEVICE FOR INFLATABLE TIRES
James Sidles, West Richfield, and Donald R. Bartley, Cuyahoga Falls, Ohio, assignors to The B. F. Goodrich Company, New York, N.Y.
Filed Feb. 9, 1970, Ser. No. 9,531
Int. Cl. B60c 23/02
U.S. Cl. 116—34                                    9 Claims

ABSTRACT OF THE DISCLOSURE

A device attachable to an inflated vehicle tire to warn of excessive deflection such as that produced by underinflation, overload, or both. The device comprises an elongated flexible member secured in compact condition to the rim, or to the inflated tire adjacent the rim, with a portion of the supporting means for the member disposed for contact with the road when the tire is operated under conditions of excessive deflection to thereby release the member for extension into striking contact with the road and/or vehicle on which the tire is mounted, thus producing audible warning of the excessive deflection.

BACKGROUND OF THE INVENTION

The operation of an inflatable vehicle tire at high speeds while excessively deflected due to underinflation, overload, or both, results in very rapid failure of the tire which may take the form of fire, blow-out or other catastrophic failure. The existence of excessive tire deflection upon modern passenger vehicles is, however, not easily detectable during operation, especially when the vehicle is provided with automatic steering, since the tendency of the vehicle to deviate from its proper path as the result of the excessive deflection of the tire, does not require any appreciable effort of the driver to correct. Furthermore, if both front or both rear tires should be excessively deflected substantially equal amounts, there would be no detectable deviation of the path of travel of the vehicle, even if power steering be not present.

The modern express highways, which permit sustained high speed travel of vehicles, accentuates the dangers from operating with tires which are excessively deflected, such as might result from slow leaks, overloads or the like. This makes it imperative that some means be provided to warn the vehicle operator of the presence of excessive deflection in a tire or tires of the vehicle so that the aforementioned or other difficulties, which may result, can be avoided. For this reason there have been numerous proposals of devices to provide indications of tire pressure during vehicle operation. These uniformly suffer from being expensive, difficult to maintain in operative condition, and/or productive of unbalance or other difficulties in the tires.

SUMMARY OF THE INVENTION

This invention provides an inexpensive, simple, easily installed device for warning the occupant of a vehicle of excessive deflection of an inflatable tire on a vehicle while the latter is in motion. This is achieved by supporting for rotation with the tire a member capable of producing an audible sound during rotation of the tire, which member is supported by a means that includes a portion operable to release the member for producing the audible sound when the tire is rotated under conditions causing deflection in excess of a predetermined acceptable limit.

More specifically, the invention comprises an elongated flexible member of sufficient length that, when extended radially relative to the axis of a tire on which it is mounted, will strike an object adjacent the tire and thereby produce a sound audible to the occupants of the vehicle so equipped, the said device including a support for mounting the member adjacent the bead of the tire in a compact arrangement such that the radial extent of the member so supported is less than the distance from the point of support to the road surface, the said supporting means having a portion adapted to release the member for extension to its full length upon contact of the supporting means with the road surface as the result of excessive deflection of the tire.

Other and more specific aspects of the invention will hereinafter become apparent from the following detailed description of the presently preferred embodiment and certain modifications thereof described with reference to the accompanying drawings forming a part of this application.

DESCRIPTION

Figure 1:
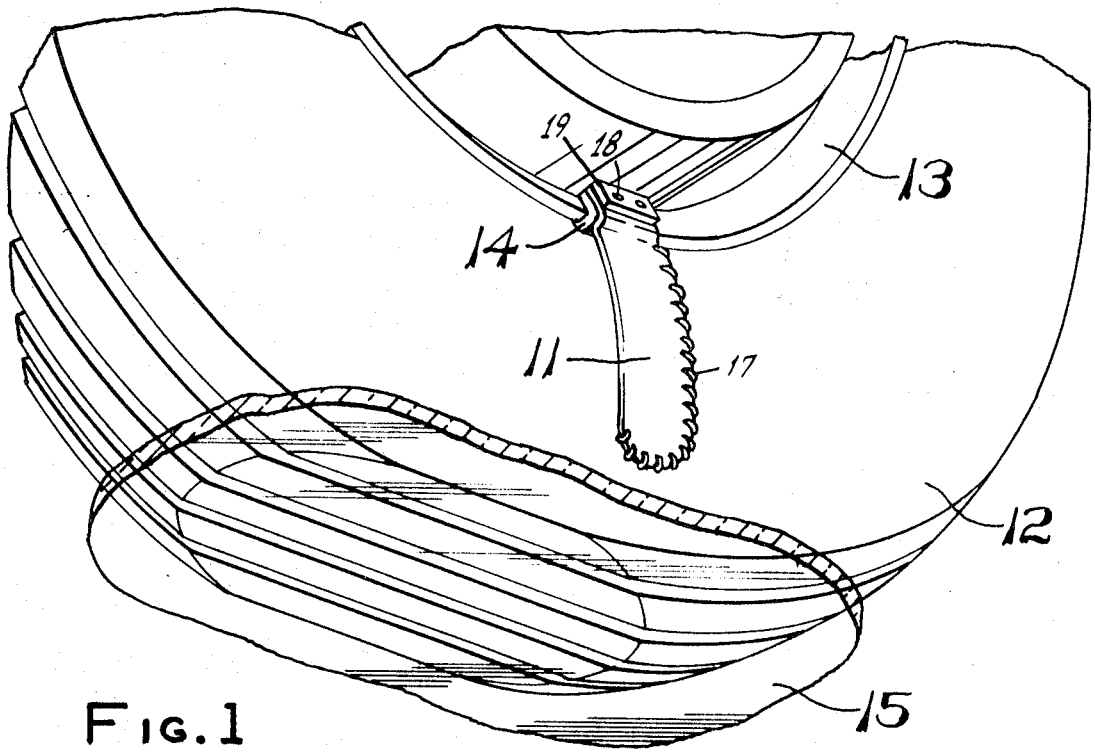
FIG. 1 is a fragmentary, perspective view showing the presently preferred embodiment of the device mounted on an inflated tire that is supported under load on a transparent surface with the tire properly inflated and not subject to overload.

The warning device of this invention may be incorporated in a number of operative embodiments differing in details of construction. In each case, however, the device is characterized as comprising a member that is capable of producing an audible sound during rotation of an inflated vehicle tire on which it is mounted, the said member normally being maintained in a condition so that it rotates with the tire without production of such sound when the tire is deflected less than a predetermined limit with the means for retaining the member in this condition including a portion operable to release the member for production of the said sound when the tire is rotated under conditions causing deflection in excess of the predetermined limit.

One specific embodiment of the invention is illustrated in the drawings as comprising an elongated flexible member 10 which is normally retained in compact condition by a supporting means, here illustrated as an envelope 11, that is adapted to be attached to an inflated pneumatic tire 12, or to the vehicle wheel 13 on which the tire is mounted. In the illustrated embodiment the attaching means comprises a wheel rim engaging clip 14. The envelope or other supporting means 11 for retaining the elongated member 10 in compact form comprises a portion which is adapted to release the member 10 upon contact with the road or other surface 15 on which the tire is rotated under load to thereby free the said member for projection to its full length where it will strike the road or other surface 15 and/or portions of the vehicle 16 on which the tire equipped with the device is mounted, thereby producing an audible sound readily perceivable by the occupants of the vehicle.

In the illustrated embodiment the support means for the member 10 is an envelope 11 in the form of an elongated pouch or bag. This envelope, which may be constructed of fabric, plastic material, or combinations thereof, is so shaped as to retain the elongated member 10 therein in folded condition, the length of the member 10 being preferably in the order of 3 to 4 times the length of the envelope.

The envelope 11 is secured for rotation with the wheel and tire, preferably at a location adjacent the bead of the tire, in a manner such that the envelope projects generally radially outwardly, with respect to the axis of the tire, toward the outer periphery of tread portion of the tire. The securing of the envelope 11 or other supporting means to the tire or wheel may be effected by inserting the radially inner end of the envelope or supporting means 11 between the bead of the tire 12 and the adjacent flange of the wheel 13. However, for convenience in handling and mounting, the presently preferred embodiment of the invention has the support member 11 provided with a clip 14 similar to that used for applying balance weights to wheel rims which clip may be secured to the rim of the tire adjacent the bead in a known manner.

Figure 2:
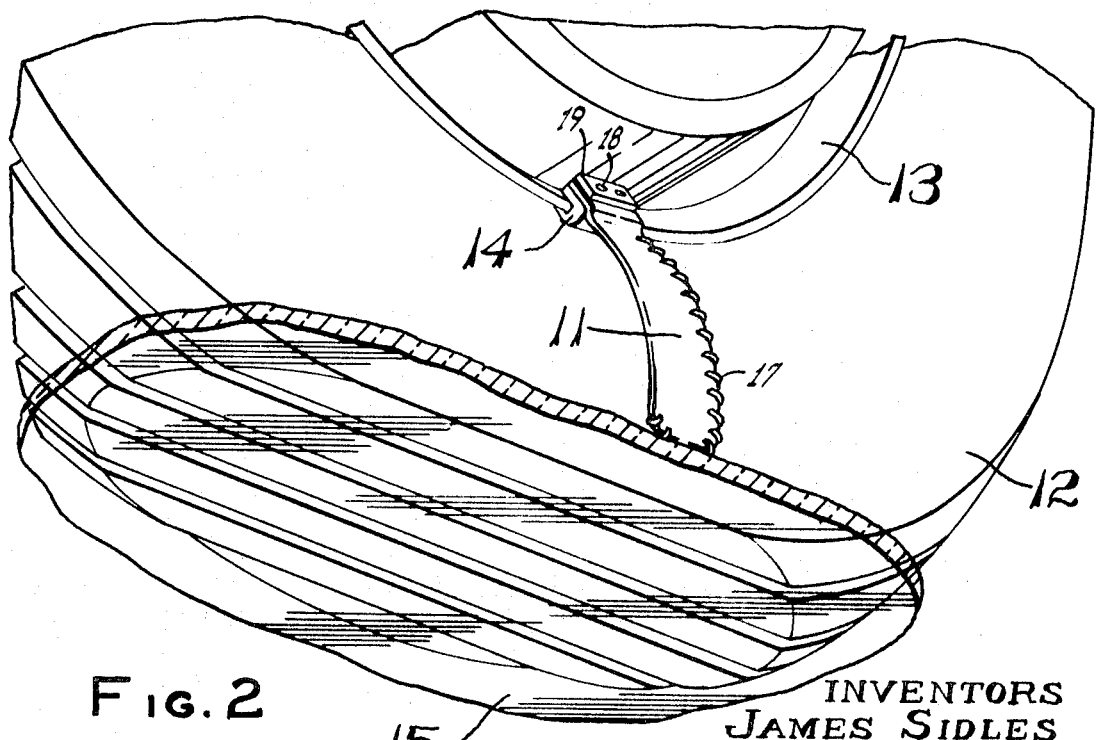
FIG. 2 is a view similar to FIG. 1 but illustrating the position of the warning device when the tire on which it is mounted is excessively deflected.
Figure 3:
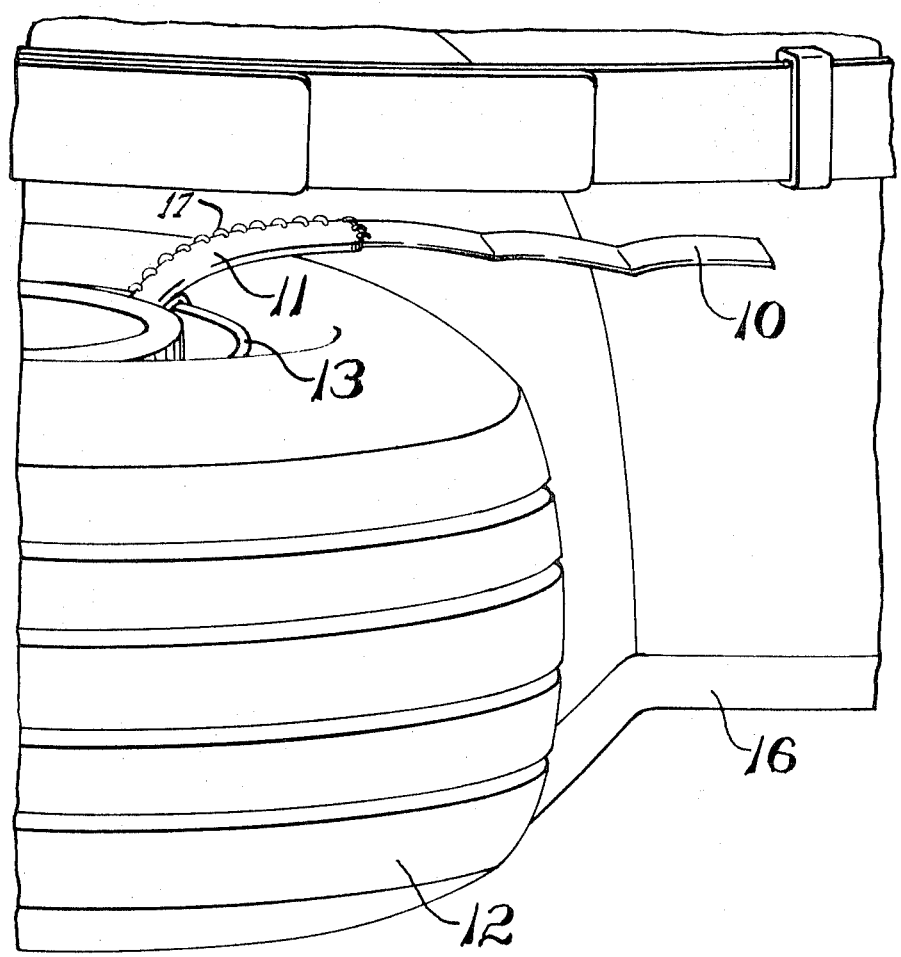
FIG. 3 is a fragmentary perspective view as seen from beneath the vehicle on which the tire is mounted showing the operated condition of the device providing a warning of excessive tire deflection.
Figure 4:
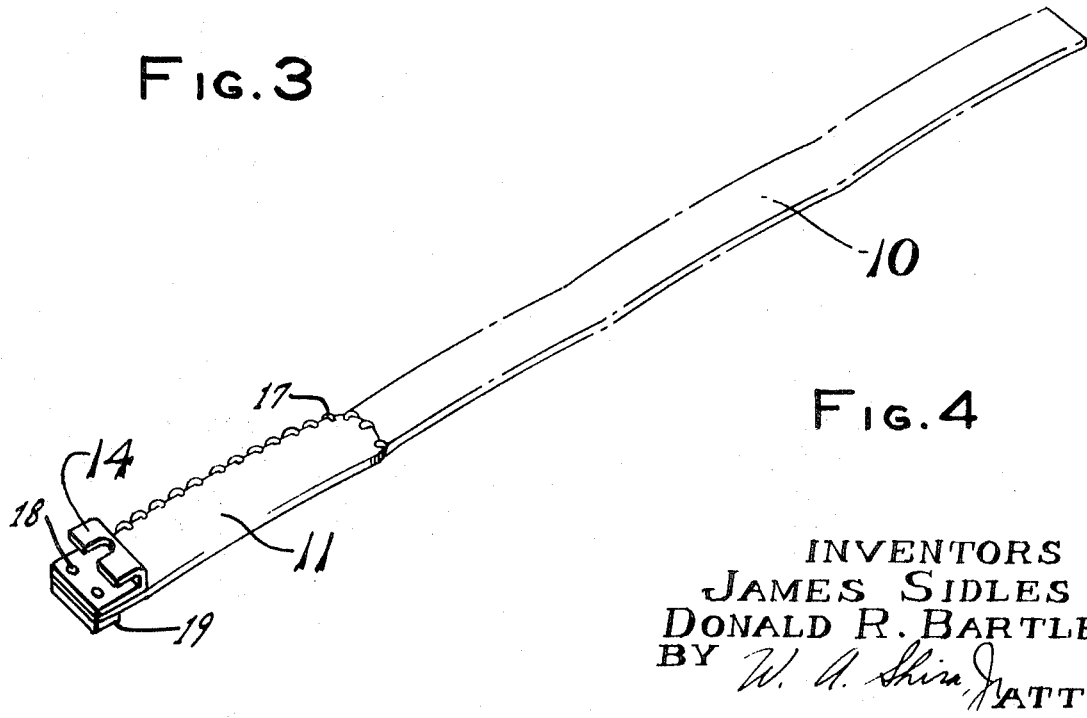
FIG. 4 is an elevational view of the warning device showing in full lines the condition of the device prior to installation and illustrating in broken lines the extended position of the elongated member of the device.

The length of the supporting means or envelope 11 is such that the radially outer end thereof, when mounted on a tire and wheel assembly, is spaced inwardly from the tire tread when the tire is properly inflated and not overloaded, the spacing being such, however, that the radially outer end of the mounted device will contact the road surface 15 when the tire is excessively deflected and operating at a speed in excess of 40 miles per hour. This is illustrated in FIGS. 1 and 2 of the drawings wherein the tire supporting surface is represented as a transparent plate. The road-contacting portion of the support means 11 for the member 10 is so made that road contact during rotation of the tire will free the member 10 so that the latter, due to the centrifugal force exerted thereon, projects from the supporting means and strikes the ground and/or the vehicle 16 on which the tire is mounted, as indicated in FIG. 3, during each revolution of the wheel following such release. This repeated striking, especially that upon the fender and other portions of the vehicle, produces a very substantial audible sound immediately directing the attention of the operator to the fact that the device has operated, thereby indicating that the associated tire is excessively deflected. Hence, the operator is warned well in advance of tire failure so that he can safely bring the vehicle to a stop and remedy the difficulty by repair of the tire or exchanging it for another.

In the presently preferred embodiment, the envelope 11 is formed by folding a suitable size piece of fabric or film along one longitudinal edge thereof and disposing the member 10 therein with one end adjacent the one end of the envelope and with the member 10 transversely folded at several longitudinally spaced locations so as to fit within the confines of the folded envelope 11. The envelope is then sewn with a thread 17 of low strength along the other narrow or outer end of the device and also along the longitudinal edge opposite the fold. The said one end of the member 10 and the adjacent end of the envelope are secured together and to the clip 14 by rivets 18 and backup plate 19 or by other suitable fastening. The length of the completed device is selected in accordance with the size and deflection characteristics of the tire on which it will be employed, so that the installed device does not contact the road surface when the tire is properly inflated and not overloaded. The device will, however, have a length such that it will contact the road surface when the deflection of the tire is excessive, for example, when the deflection is in the order of 30 percent of the undeflected inflated height of the tire measured from bead to tread, and the tire is rotating at speeds in excess of 40 miles per hour. This corresponds to the deflection which occurs in a tire of two-ply construction on a five or six passenger vehicle when the inflation pressure, which normally is in the order of 24 p.s.i., drops to 16 p.s.i. and the tire is under a load of five passengers or equivalent weight. A device so made will rotate with the tire indefinitely without actuation, so long as the deflection of the tire does not exceed the aforementioned amount. However, when the deflection limit is reached or exceeded, continued operation at speeds in excess of 40 m.p.h. will result in the rupturing of the thread 17 and/or outer end of the envelope 11 within 5 to 25 miles of such operation, thereby freeing the end of the member 10 so that it is projected by centrifugal force from the envelope providing the audible warning aforementioned by striking adjacent portions of the vehicle and/or road surface.

The elongated member 10 may take a variety of forms and be made from a number of different materials. Satisfactory operation, however, has been achieved with a strip of cured elastomeric material such as that normally used for carcass plies of passenger tires, which strip, therefor, comprises elastomeric material reinforced with longitudinally extending cords, the width of the strip being in the order of one-quarter to one-half inch and the length being from 3 to 4 times, preferably 4 times, the length of the supporting means or envelope 11.

Although one specific embodiment of the invention has been described in detail, it will be apparent that alterations may be made in the materials and mode of assembly of the parts of the device without departing from the inventive concept. For example, although the means for mounting and retaining the elongated member 10 has been shown as an envelope 11 provided with a clip 14, it will be apparent that other releasable supporting and retaining means may be employed, so long as it performs the function of retaining the member 10 from projection into striking engagement with other objects during operation of the tire to which it is attached when the latter is properly inflated and loaded, but which retaining means will release the member upon operation of the tire at speeds in excess of 40 miles per hour under conditions of excessive deflection of the tire. The dimensions and strength of the supporting means can be readily selected to adapt the device for use upon tires of various sizes and for operation at tire deflections in excess of any predetermined amount. Furthermore, although the member 10 has been described as formed from cured, tire-ply stock, it will be evident that other materials may be employed therefor, and the member may be, if desired, provided with a weight or enlargement at the outer end thereof to incerase the sound made when it is free to strike adjacent objects.

These specifically mentioned, as well as other, modifications and substitutions of materials, which will be readily apparent to those skilled in the art, are all encompassed within the ambit of the invention. Hence, the latter is not to be considered as limited to the specific embodiment or suggested modifications, except as may be required by the spirit and scope of the appended claims.

We claim:

1. A device for providing a warning of excessive deflection of an inflated vehicle tire rotating under load comprising an elongated flexible member capable when extended of projecting beyond the periphery of the tire and striking adjacent objects thereby producing an audible sound during rotation of the tire, means supporting said member in folded compact condition at a location adjacent a bead of the tire for rotation with the tire and with the member extending radially outwardly from the location of mounting, the radial extent of the member in said compact arrangement when the tire is subject to normal load and is properly inflated being less than the distance from point of support of the member to the surface on which the tire travels, the said means including a rupturable portion adapted to engage the surface with which the tire is in contact upon excessive deflection of the tire and by such engagement breaking to release said member from its compact condition so that an end portion of the member is projected by centrifugal force from said means and beyond the periphery of the tire.

2. A device as defined in claim 1 wherein said member is an elongated strip of flexible elastomer reinforced by at least one cord extending longitudinally thereof.

3. A device as defined in claim 1 wherein said supporting means for mounting the said member includes a portion adapted to be positioned between the tire bead and the rim of the wheel on which the tire is mounted.

4. A device as defined in claim 1 wherein the said supporting means for mounting said member includes a wheel rim engaging clip.

5. A device as defined in claim 1 wherein the said supporting means for the said member includes an elongated envelope for retention of said member in folded condition with one end of said envelope adapted to be secured to the tire adjacent the bead thereof and with the said envelope projecting generally radially of the tire from its point of attachment, the end of said envelope opposite the end adapted for attachment being adapted to release said member from its folded condition upon contact with the road surface on which the tire travels when the tire is excessively deflected.

6. A device as defined in claim 5 wherein the said opposite end of the envelope is closed by a material which is readily broken by contact with the road surface.

7. The combination with a wheel for a vehicle and an inflatable tire mounted thereon of a device for producing a warning of excessive deflection of said tire when rotating under load, the said device comprising an elongated flexible member having a length greater than the distance from the bead region of the tire to the tread thereof and capable of producing an audible sound during rotation of the tire by striking objects adjacent thereto, means supporting said member in a folded condition for rotation with the tire, the last-mentioned means including means for attaching said member to the wheel and tire assembly adjacent a bead of the tire with the folded member projecting generally radially outwardly from the point of attachment, when the tire is properly inflated and loaded, a distance less than the distance from the point of attachment to the road surface over which the vehicle travels, the said supporting means including a rupturable portion adapted to be broken by contact with the said road surface upon excessive deflection of the tire and thereby release the said member from its folded condition so that centrifugal force causes it to project radially beyond the periphery of the tire during further rotation and thereby produce an audible sound by striking against adjacent objects.

8. The combination as defined in claim 7 wherein said supporting means includes an elongated envelope the radially outer portion of which is adapted to be readily broken by contact with the road surface.

9. The combination as defined in claim 8 wherein the said envelope has a length and is so positioned that the radially outer end thereof contacts the road surface when the tire deflection is in excess of 30% and the vehicle on which the tire is mounted is travelling in excess of 40 miles per hour.

References Cited
UNITED STATES PATENTS

| | | | |
|---|---|---|---|
| 1,451,291 | 4/1923 | Darling | 116—34 |
| 1,668,821 | 5/1928 | Rice | 116—34 |
| 1,750,509 | 3/1930 | Craig | 116—34 |
| 2,917,020 | 12/1959 | Rivers | 116—34 |

LOUIS CAPOZI, Primary Examiner